(12) United States Patent
Radovcic et al.

(10) Patent No.: US 8,983,375 B2
(45) Date of Patent: Mar. 17, 2015

(54) PERSONALITY ADAPTER FOR MODULAR RADIO COMMUNICATIONS SYSTEMS

(75) Inventors: Boris Radovcic, Rockaway, NJ (US); Christopher O'Bara, Parsippany, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 167 days.

(21) Appl. No.: 13/461,888

(22) Filed: May 2, 2012

(65) Prior Publication Data

US 2012/0295551 A1 Nov. 22, 2012

Related U.S. Application Data

(60) Provisional application No. 61/484,012, filed on May 9, 2011.

(51) Int. Cl.
*H04B 5/00* (2006.01)
*H04B 1/38* (2006.01)

(52) U.S. Cl.
CPC ...................................... *H04B 1/38* (2013.01)
USPC .......................................... 455/41.1; 455/73

(58) Field of Classification Search
CPC .............. H04B 1/03; H04B 1/04; H04B 1/38; H04B 1/24; H04B 1/16
USPC ............... 455/73, 41.1; 710/62, 711; 713/300
See application file for complete search history.

(56) References Cited

U.S. PATENT DOCUMENTS

| | | | | |
|---|---|---|---|---|
| 5,058,110 A | * | 10/1991 | Beach et al. | 370/464 |
| 5,218,302 A | * | 6/1993 | Loewe et al. | 324/380 |
| 6,088,785 A | * | 7/2000 | Hudson et al. | 712/35 |
| 8,060,670 B2 | * | 11/2011 | Yu et al. | 710/62 |
| 8,072,331 B2 | * | 12/2011 | Narendra et al. | 340/572.1 |
| 2002/0081987 A1 | * | 6/2002 | Yoshida et al. | 455/277.1 |
| 2005/0154930 A1 | * | 7/2005 | Morrow | 713/300 |
| 2005/0200998 A1 | * | 9/2005 | Rowan | 360/69 |
| 2009/0174366 A1 | * | 7/2009 | Ahmad et al. | 320/114 |
| 2010/0049878 A1 | * | 2/2010 | Yu et al. | 710/11 |

* cited by examiner

*Primary Examiner* — Wesley Kim
*Assistant Examiner* — Raj Chakraborty
(74) *Attorney, Agent, or Firm* — Leo Zucker; Daniel J. Long

(57) ABSTRACT

An adapter for a communications module includes first terminals for connection with a host interface of a given platform, and second terminals for connection with the communications module. The host interface provides signals associated with the platform and power at corresponding first terminals. The communication module provides associated signals and connections for supplying voltages to the module circuits, at corresponding second terminals. A power converter connected to the first terminals is arranged to output fixed voltages one or more of which is required for the communications module. A power management stage connected to the output of the power converter is arranged to apply the voltages to the second terminals so that the voltages are properly supplied to the module circuits. A buffer stage connected to the first and the second terminals is arranged to buffer or condition shared signals among the host interface and the communications module.

7 Claims, 2 Drawing Sheets

PERSONALITY ADAPTER FOR MODULAR RADIO COMMUNICATIONS SYSTEMS

CROSS-REFERENCE TO RELATED APPLICATION

This application claims priority under 35 U.S.C. Sec. 119 (e) of U.S. Provisional Patent Application No. 61/484,012 filed May 9, 2011, titled Modular Approach to GLS Core Engine Design, and incorporated herein by reference in its entirety.

BACKGROUND OF THE INVENTION

1. Field of the Invention

The present invention relates generally to radio systems, and particularly to modular constructions or architectures for such systems.

2. Discussion of the Known Art

Radio communications systems, including systems that provide communications for vehicles in the military, typically include a number of interconnected modules each of which contains a certain group of system components. For example, a known ground mobile radio (GMR) ground vehicle aerodynamics (GVA) system includes modules such as power amplifiers, transceivers, and certain platform interface modules (PIM). Such systems may also include a so-called core engine (CE) radio transceiver module and other devices that require specified voltages and signals in order to operate. In a CE module, the radio hardware may reside on two circuit cards, viz, a modem card and a radio frequency (RF) card. The modem card provides digital signal processing (DSP) and baseband to intermediate frequency (IF) signal conversions, and the RF card provides IF to RF signal conversions for transmission and reception of communications signals over specified channels.

Although a CE module and its components may have the potential for use with a number of different vehicle platforms or hosts, a problem arises in that the interfaces provided by the hosts for connecting with and operating the module may differ from one host to another, or are otherwise unsuitable. A need therefore exists for a system wherein the power and signals supplied by a given host interface, are adapted or converted to the power levels and signals specified for a CE or other communications module that is to be used by the host platform.

SUMMARY OF THE INVENTION

According to the invention, an adapter for a communications module has first terminals for connection with a host interface of a given platform, and second terminals for connection with a communications module. The host interface provides host signals associated with the platform and power at corresponding ones of the first terminals. The communications module provides associated signals and connections for supplying voltages to the module, at corresponding ones of the second terminals.

A power converter is connected to the first terminals and is arranged to output a number of fixed voltages one or more of which is specified for operation of the communications module, and a power management stage is connected to the converter output and is arranged to apply the voltages to the second terminals so that the voltages are properly supplied to the circuits in the module. A buffer stage connected to the first and the second terminals is arranged to buffer or otherwise condition signals that are shared among the host interface and the communications module.

For a better understanding of the invention, reference is made to the following description taken in conjunction with the accompanying drawing and the appended claims.

DETAILED DESCRIPTION OF THE INVENTION

Figure 1:
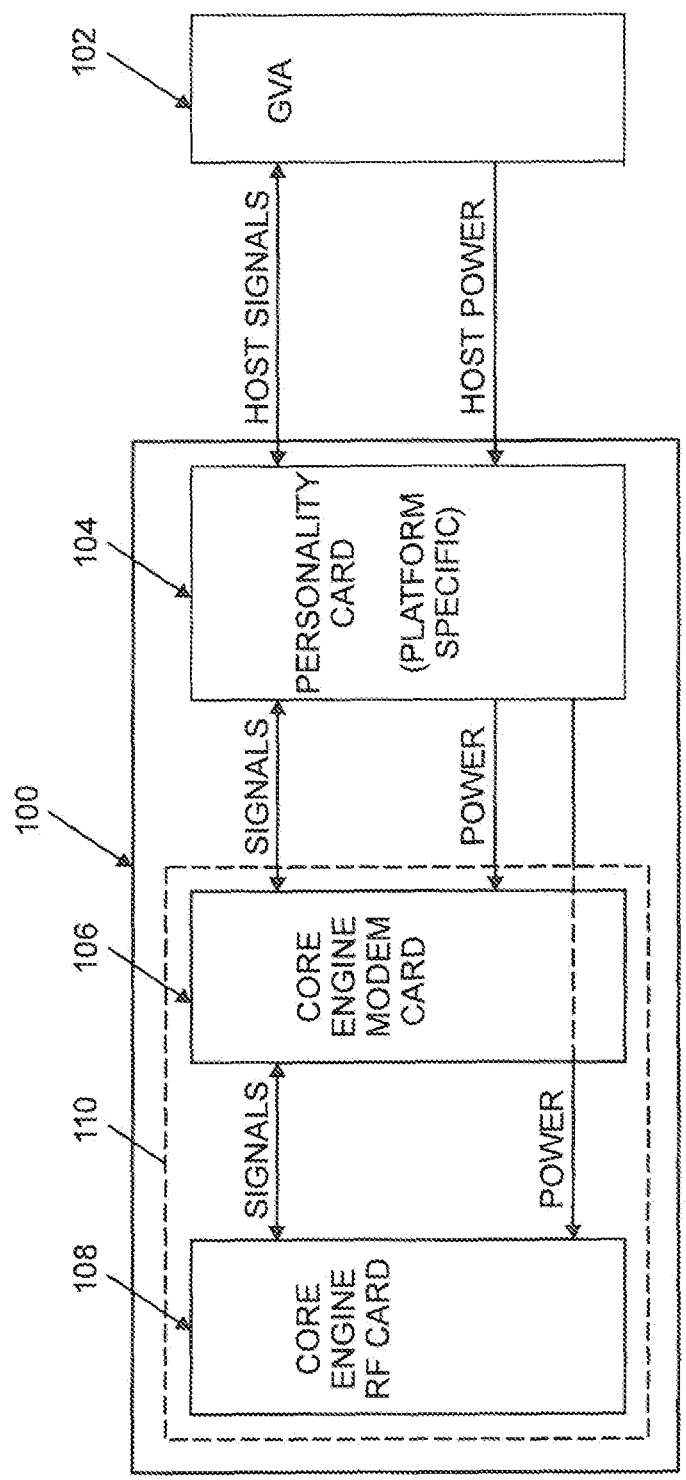
FIG. 1 is a block diagram of a system for conditioning power and signals supplied from a host interface to a core engine module, according to the invention.

FIG. 1 is a block diagram of a system 100 for adapting certain voltages and signals associated with a ground vehicle adapter (GVA) interface 102, to specified voltages and signals for operation of a modem card 106 and an RF card 108 in a core engine (CE) module 110, according to the invention. The system 100 features at least one adapter or "personality" card 104 that is constructed and arranged to supply the required power or voltage and signals to the CE module 110, based on the host signals and the host power associated with the GVA interface 102.

In the illustrated embodiment, the personality card 104 is configured to plug into or otherwise connect with the modem card 106 of the CE module 110. The card 104 adapts the GVA backplane signals and available voltages to those specified for the module 110, including providing power, power switching, and conditioning for the modem card 106 if required. The personality card or cards 104 may be in the form of interconnect or rigid flex cards, or the cards 104 may be made part of existing interconnect or flex cards provided in the module 110.

To meet strict system power requirements, the personality cards 104 may also be configured in a known manner to provide power management to the module 110, including switching off supply voltages to the module 110 when not needed. Another example of a platform specific function of the personality cards 104 is, e.g., converting an Ethernet interface on the GVA backplane to a USB interface that is required for operation of the modem card 106 in FIG. 1. The cards 104 thus provide a standard interface for the module 110, enabling it to be used by the GVA or other radio platforms having different host interfaces.

Thus, according to the invention, the personality cards 104 are constructed and arranged to (a) adapt incoming voltages and signal conditioning supplied by the GVA or other host interface to the voltages and signals specified for the CE module 110, (b) convert various communication formats to communicate with the modem card 106 of the module 110 such as, e.g., converting GVA Ethernet formatted signals to a USB format recognized by the modem card 106, and/or (c) adapt incoming voltages to one or more supply voltages that are specified for module 110.

Figure 2:
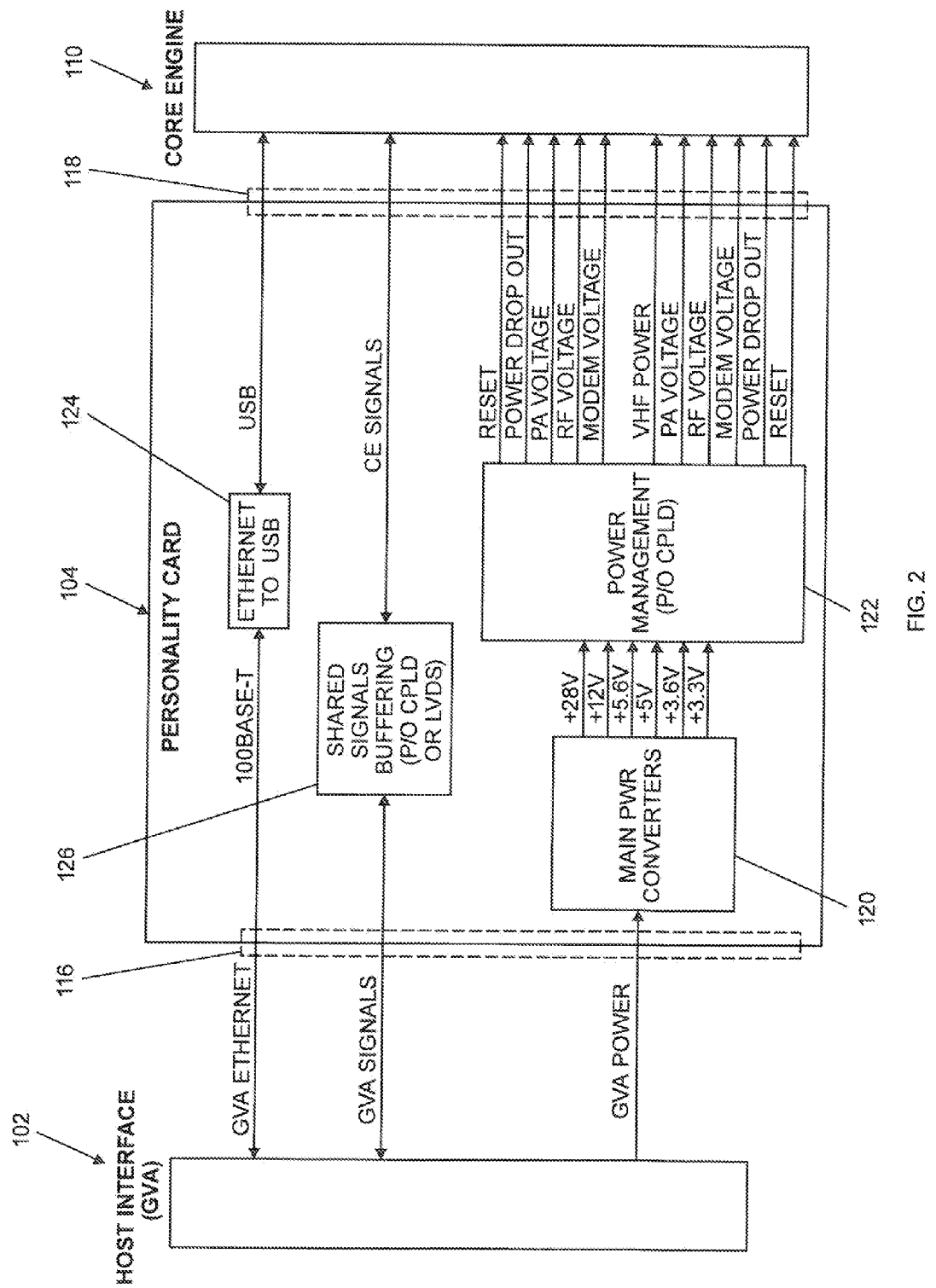
FIG. 2 is a schematic block diagram of an adapter or "personality" card in the system FIG. 1, according to the invention.

FIG. 2 is a detailed block diagram of the personality card 104 in FIG. 1. The host (GVA) interface 102 is shown at the left in FIG. 2, and is connected to a first set of terminals 116 on the card 104. The CE module 110 is shown at the right of FIG. 2, and the module 110 connects to a second set of terminals 118 of the card 104.

Power supplied by the GVA interface 102 is applied through the terminals 116 to a set of main power converters 120 provided on the personality card 104. As shown in FIG. 2, the converters 120 are configured in a known manner to convert the power supplied by the GVA or other potential host interfaces, to a number of fixed voltages ranging, for example, between +3.3 and +28 volts DC. The fixed voltages are applied to a power management stage 122 on the card 104, and the stage 122 is operative to apply the voltages to the card terminals 118 so that the voltages and certain power management signals (e.g., power drop out and reset) are supplied to corresponding circuits in the CE module 110 as shown in FIG. 2. Note that the CE or other communications modules may use some or all of the voltages and interface signals produced at the terminals 118 of the card 104 to meet different radio system applications. Also note that the management stage 122 on the card 104 is preferably configured to turn any of the voltages supplied to a given module on or off, depending on a desired operating mode.

An Ethernet (e.g., 100Base-T) communication channel supplied by the GVA interface 102 at the upper left of FIG. 2 connects to the card terminals 116, and is converted to USB format by a conventional conversion device 124 on the card 104. A corresponding USB communication channel is established by the device 124 for the CE module 110 through the terminals 118 of the card 104.

Control and other shared signals associated with the GVA interface 102 at the left of FIG. 2, are connected to the card terminals 116 and are appropriately buffered or otherwise conditioned by a buffer stage 126 on the card 104. Corresponding signals associated with the CE module 110 are connected with the buffer stage 126 through the card terminals 118.

As disclosed herein, the adapter or personality card 104 allows a CE or other communications module to be used in many different platforms. Instead of the module, the card 104 is provided with such devices and/or stages as required to allow the module to operate with a given platform. Thus, adapting a CE or other existing communications module to a new platform only requires the production of a personality card with the appropriate stages and devices, leaving the module and its circuit boards in their original form. The cost of adapting existing communications modules to new platforms is therefore significantly reduced.

While the foregoing represents preferred embodiments of the present invention, it will be understood by persons skilled in the art that various modifications, additions, and changes can be made without departing from the spirit and scope of the invention, and that the invention includes all such modifications and changes that are within the scope of the appended claims.

We claim:

1. A personality adapter for enabling a core engine (CE) radio transceiver module having connection terminals each of which corresponds to an operating voltage or a signal associated with the CE radio transceiver module, to be used with an outside host platform interface having connection terminals each of which corresponds to a power or a signal associated with the host platform interface, the adapter comprising:
   a first set of connection terminals arranged for connection with corresponding connection terminals of the outside host platform interface for obtaining power for the CE radio transceiver module, and for passing operating signals between the outside host platform interface and the module;
   a second set of connection terminals arranged for connection with corresponding connection terminals of the CE radio transceiver module, for providing specified voltages and certain power management signals to the module, and for passing the operating signals between the module and the outside host platform interface;
   a power converter having an input connected to one of the first set of connection terminals of the adapter that is arranged to connect with a power terminal of the outside host platform interface, wherein the power converter is constructed and arranged to provide the specified voltages for operation of the CE radio transceiver module;
   a power management stage connected to an output of the power converter and configured to apply the specified voltages and the power management signals to the second set of connection terminals of the adapter, so that the voltages and the management signals are supplied to corresponding circuits in the CE radio transceiver module; and
   a buffer stage connected to certain ones of the first and the second sets of connection terminals of the adapter and configured to buffer or otherwise condition operating signals passing between the outside host platform interface and the CE radio transceiver module; and
   wherein the outside host platform interface is a ground vehicle adapter (GVA) interface.

2. An adapter according to claim 1, wherein the adapter is in the form of a circuit card or a personality card.

3. An adapter according to claim 2, wherein the circuit or personality card is configured to plug into or otherwise connect with a card of the CE radio transceiver module.

4. An adapter according to claim 2, wherein the circuit or personality card is in the form of an interconnect or rigid flex card.

5. An adapter according to claim 1, including a conversion device connected to certain ones of the first and the second sets of connection terminals of the adapter, and configured for converting between a first communications signal format associated with the outside host platform interface, and a second communications signal format associated with the CE radio transceiver module.

6. An adapter according to claim 5, wherein one of the communications signal formats is a USB format.

7. An adapter according to claim 5, wherein one of the communications signal formats is an Ethernet format.

* * * * *